(12) United States Patent
Gass

(10) Patent No.: US 8,006,595 B2
(45) Date of Patent: Aug. 30, 2011

(54) APPARATUS AND METHOD FOR DETECTING DANGEROUS CONDITIONS IN POWER EQUIPMENT

(75) Inventor: Stephen F. Gass, West Linn, OR (US)

(73) Assignee: SD3, LLC, Tualatin, OR (US)

( * ) Notice: Subject to any disclaimer, the term of this patent is extended or adjusted under 35 U.S.C. 154(b) by 0 days.

(21) Appl. No.: 12/655,695

(22) Filed: Jan. 4, 2010

(65) Prior Publication Data

US 2010/0180739 A1    Jul. 22, 2010

Related U.S. Application Data

(63) Continuation of application No. 11/975,985, filed on Oct. 22, 2007, now Pat. No. 7,640,835, which is a continuation of application No. 09/929,221, filed on Aug. 13, 2001, now Pat. No. 7,284,467.

(60) Provisional application No. 60/255,056, filed on Dec. 11, 2000, provisional application No. 60/255,057, filed on Dec. 12, 2000, provisional application No. 60/255,058, filed on Dec. 14, 2000, provisional application No. 60/255,059, filed on Dec. 14, 2000, provisional application No. 60/255,089, filed on Dec. 12, 2000, provisional application No. 60/255,094, filed on Dec. 12, 2000, provisional application No. 60/255,169, filed on Dec. 13, 2000, provisional application No. 60/255,170, filed on Dec. 13, 2000, provisional application No. 60/255,200, filed on Dec. 11, 2000, provisional application No. 60/255,201, filed on Dec. 13, 2000, provisional application No. 60/255,206, filed on Dec. 13, 2000, provisional application No. 60/255,210, filed on Dec. 13, 2000, provisional application No. 60/225,211, filed on Aug. 14, 2000, provisional application No. 60/255,212, filed on Dec. 12, 2000.

(51) Int. Cl.
*B26D 5/00* (2006.01)
*B23D 45/00* (2006.01)

(52) U.S. Cl. ............ 83/62.1; 83/58; 83/DIG. 1; 83/490; 83/471.2; 83/477.1

(58) Field of Classification Search ............... 83/62.1, 83/13, 58, DIG. 1, 471.3, 477.1, 490, 589, 83/397.1, 477.2, 297, 644; 320/166, 562, 320/658, 663, 665–668, 675, 686, 688, 698; 361/181, 281, 286, 179
See application file for complete search history.

(56) References Cited

U.S. PATENT DOCUMENTS

| 1,551,900 A | 9/1925 | Morrow |
|---|---|---|
| 2,554,124 A | 5/1951 | Salmont |

(Continued)

FOREIGN PATENT DOCUMENTS

DE    76186    8/1921

(Continued)

OTHER PUBLICATIONS

Gordon Engineering Corp., Product Catalog, pp. cover, 1, 3 and back, Brookfield, Connecticut, US, Oct. 1997.

(Continued)

*Primary Examiner* — Ghassem Alie

(57) ABSTRACT

Woodworking machines are disclosed having electrically conductive cutting tools adapted to cut workpieces. The machines include a contact detection system capacitively coupled to the cutting tool, and adapted to detect contact between a person and the cutting tool. The machines also include a reaction system configured to cause one or more predetermined actions to take place upon detection of contact between a person and the cutting tool by the contact detection system.

9 Claims, 7 Drawing Sheets

U.S. PATENT DOCUMENTS

| | | | |
|---|---|---|---|
| 3,785,230 A | 1/1974 | Lokey |
| 3,829,850 A | 8/1974 | Guetersloh |
| 3,858,095 A | 12/1974 | Friemann et al. |
| 3,953,770 A | 4/1976 | Hayashi |
| 4,048,886 A | 9/1977 | Zettler |
| 4,117,752 A | 10/1978 | Yoneda |
| 4,190,000 A | 2/1980 | Shaull et al. |
| 4,453,112 A | 6/1984 | Sauer et al. |
| 4,589,047 A | 5/1986 | Gaus et al. |
| 4,792,965 A | 12/1988 | Morgan |
| 4,965,909 A | 10/1990 | McCullough et al. |
| 5,081,406 A | 1/1992 | Hughes et al. |
| 5,198,702 A | 3/1993 | McCullough et al. |
| 5,231,359 A | 7/1993 | Masuda et al. |
| 5,272,946 A | 12/1993 | McCullough et al. |
| 5,341,133 A | 8/1994 | Savoy et al. |
| 5,602,734 A | 2/1997 | Kithil |
| 5,730,165 A | 3/1998 | Philipp |
| 5,880,954 A | 3/1999 | Thomson et al. |
| 5,921,367 A | 7/1999 | Kashioka et al. |
| 5,942,975 A | 8/1999 | Sorensen |
| 6,064,629 A | 5/2000 | Stringer et al. |
| 6,095,092 A | 8/2000 | Chou |
| 6,150,826 A | 11/2000 | Hokodate et al. |
| 6,257,061 B1 | 7/2001 | Nonoyama et al. |
| 6,366,099 B1 | 4/2002 | Reddi |
| 6,376,939 B1 | 4/2002 | Suzuki et al. |
| 6,492,802 B1 | 12/2002 | Bielski |
| 6,757,602 B2 | 6/2004 | Breed et al. |
| 7,173,537 B2 | 2/2007 | Voigtlaender |
| 7,284,467 B2 | 10/2007 | Gass et al. |
| 7,421,932 B1 | 9/2008 | Heinzmann et al. |
| 2004/0123709 A1 | 7/2004 | Metzger, Jr. |

FOREIGN PATENT DOCUMENTS

| | | |
|---|---|---|
| DE | 2800403 | 7/1979 |
| DE | 4235161 | 5/1993 |
| DE | 4326313 | 2/1995 |
| DE | 19609771 | 6/1998 |
| EP | 0362937 | 4/1990 |
| FR | 2556643 | 6/1985 |
| FR | 2570017 | 3/1986 |
| GB | 1132708 | 11/1968 |

OTHER PUBLICATIONS

Analog Devices, Inc., 3-Axis Capacitive Sensor—Preliminary Technical Data AD7103, pp. 1-40, © 1998.

*Microelectronic Circuits*, Sedra et al., pp. 995-997, 1998.

U.S. Appl. No. 60/157,340, filed Oct. 1, 1999, entitled "Fast-Acting Safety Stop."

U.S. Appl. No. 60/182,866, filed Feb. 16, 2000, entitled "Fast-Acting Safety Stop."

IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).

Young Inventor: Teen's Device Earns Her Trip to Science Fair, *The Arizona Republic*, May 5, 2006.

Operator Injury Mitigation Using Electronic Sensing and Mechanical Braking and Decoupling Devices in Handheld Circular Saws, Erin F. Eppard, date unknown.

*You Should Have Invented It*, French television show DVD/video, date unknown.

APPARATUS AND METHOD FOR DETECTING DANGEROUS CONDITIONS IN POWER EQUIPMENT

CROSS-REFERENCE TO RELATED APPLICATIONS

This application is a continuation of U.S. patent application Ser. No. 11/975,985, filed Oct. 22, 2007, issuing as U.S. Pat. No. 7,640,835 on Jan. 5, 2010, which is a continuation of U.S. patent application Ser. No. 09/929,221, filed Aug. 13, 2001, issued as U.S. Pat. No. 7,284,467 on Oct. 23, 2007, which in turn claims the benefit of and priority from the following U.S. Provisional Patent Application 60/255,056 filed Dec. 11, 2000, 60/255,057 filed Dec. 12, 2000, 60/255,058 filed Dec. 14, 2000, 60/255,059 filed Dec. 14, 2000, 60/255,089 filed Dec. 12, 2000, 60/255,094 filed Dec. 12, 2000, 60/255,169 filed Dec. 13, 2000, 60/255,170 filed Dec. 13, 2000, 60/255,200 filed Dec. 11, 2000, 60/255,201 filed Dec. 13, 2000, 60/255,206 filed Dec. 13, 2000, 60/255,210 filed Dec. 13, 2000, 60/225,211 filed Aug. 14, 2000, and 60/255,212, filed Dec. 12, 2000. All of the above applications are hereby incorporated by reference.

FIELD

The present invention relates to safety systems, and more particularly to a high-speed safety system for use on power equipment.

BACKGROUND

Beginning with the industrial revolution and continuing to the present, mechanized equipment has allowed workers to produce goods with greater speed and less effort than possible with manually-powered tools. Unfortunately, the power and high operating speeds of mechanized equipment creates a risk for those operating such machinery. Each year thousands of people are maimed or killed by accidents involving power equipment.

As might be expected, many systems have been developed to minimize the risk of injury when using power equipment. Probably the most common safety feature is a guard that physically blocks an operator from making contact with dangerous components of machinery, such as belts, shafts or blades. In many cases, guards are effective to reduce the risk of injury, however, there are many instances where the nature of the operations to be performed precludes using a guard that completely blocks access to hazardous machine parts.

Various systems have been proposed to prevent accidental injury where guards cannot effectively be employed. For instance, U.S. Pat. Nos. 3,953,770, 4,075,961, 4,470,046, 4,532,501 and 5,212,621, the disclosures of which are incorporated herein by reference, disclose radio-frequency safety systems which utilize radio-frequency signals to detect the presence of a user's hand in a dangerous area of the machine and thereupon prevent or interrupt operation of the machine.

U.S. Pat. Nos. 4,959,909, 5,025,175, 5,122,091, 5,198,702, 5,201,684, 5,272,946, and 5,510,685 disclose safety systems for use with meat-skinning equipment, and are incorporated herein by reference. These systems interrupt or reverse power to the motor, or disengage a clutch, upon contact with a user's hand by any dangerous portion of the machine. Typically, contact between the user and the machine is detected by monitoring for electrical contact between a fine wire mesh in a glove worn by the user and some metal component in the dangerous area of the machine. Although such systems are suitable for use with meat skinning machines, they are relatively slow to stop the motion of the cutting element because they rely on the operation of solenoids or must overcome the inertia of the motor. However, because these systems operate at relatively low speeds, the blade does not need to be stopped rapidly to prevent serious injury to the user.

U.S. Pat. Nos. 3,785,230 and 4,026,177, the disclosures of which are herein incorporated by reference, disclose a safety system for use on circular saws to stop the blade when a user's hand approaches the blade. The system uses the blade as an antenna in an electromagnetic proximity detector to detect the approach of a user's hand prior to actual contact with the blade. Upon detection of a user's hand, the system engages a brake using a standard solenoid. Unfortunately, such a system is prone to false triggers and is relatively slow acting because of the solenoid.

U.S. Pat. No. 4,117,752, which is herein incorporated by reference, discloses a similar braking system for use with a band saw, where the brake is triggered by actual contact between the user's hand and the blade. However, the system described for detecting blade contact does not appear to be functional to accurately and reliably detect contact. Furthermore, the system relies on standard electromagnetic brakes operating off of line voltage to stop the blade and pulleys of the band saw. It is believed that such brakes would take 50 ms-1 s to stop the blade. Therefore, the system is too slow to stop the blade quickly enough to avoid serious injury.

None of these existing systems have operated with sufficient speed and/or reliability to prevent serious injury with many types of commonly used power tools. Although proximity-type sensors can be used with some equipment to increase the time available to stop the moving pieces, in many cases the user's hands must be brought into relatively close proximity to the cutting element in the normal course of operation. For example, many types of woodworking equipment require that the user's hands pass relatively close to the cutting tools. As a result, existing proximity-type sensors, which are relatively imprecise, have not proven effective with this type of equipment.

DETAILED DESCRIPTION

Figure 1:
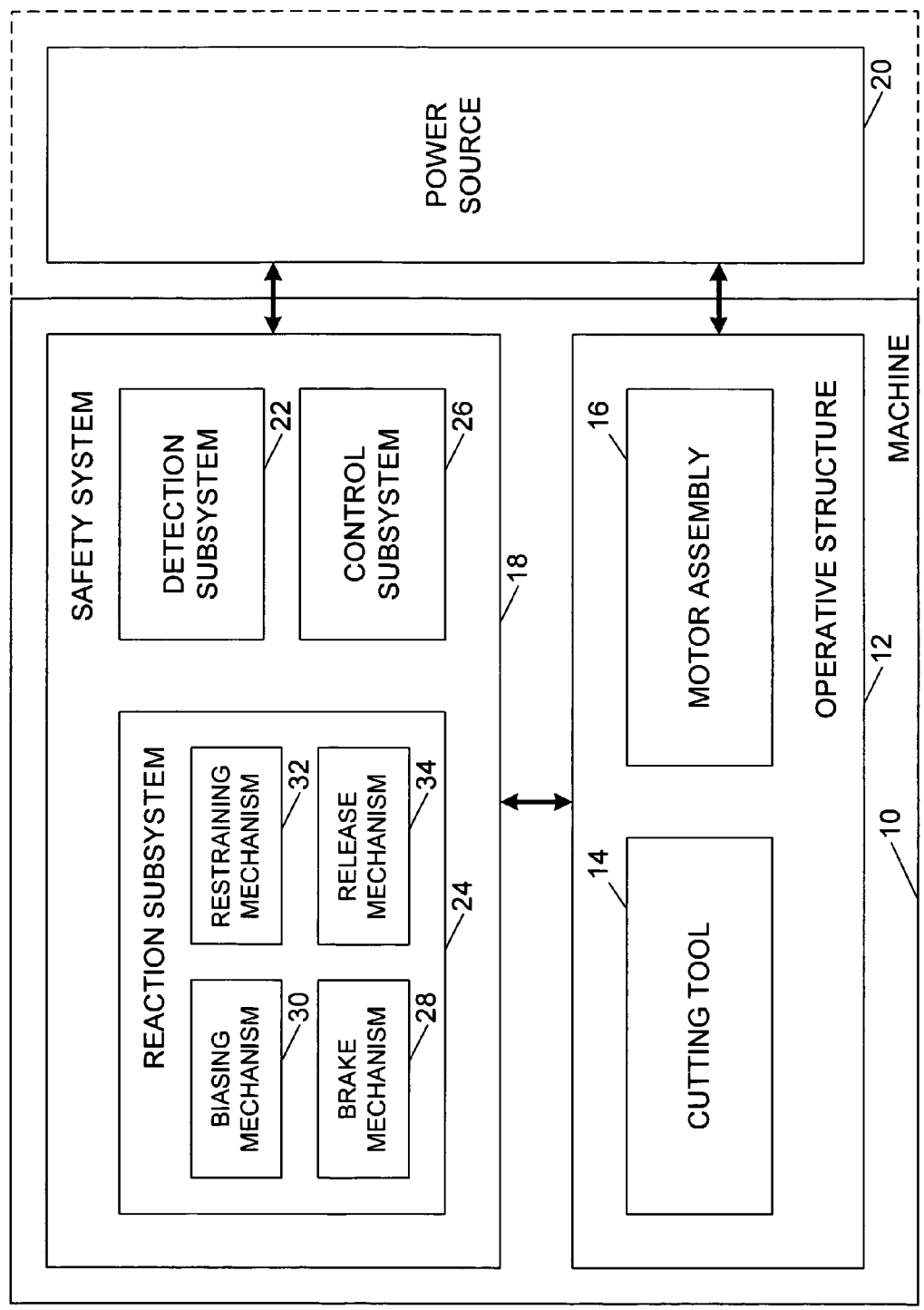
FIG. 1 is a schematic block diagram of a machine with a fast-acting safety system according to the present invention.

A machine according to the present invention is shown schematically in FIG. 1 and indicated generally at 10. Machine 10 may be any of a variety of different machines adapted for cutting workpieces, such as wood, including a table saw, miter saw (chop saw), radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, entitled "Cutting Tool Safety System," filed Aug. 14, 2000 by SD3, LLC, the disclosure of which is herein incorporated by reference. Retraction of the cutting tool from its operating position is described in more detail in U.S. Provisional Patent Application Ser. No. 60/225,089, entitled "Retraction System For Use In Power Equipment," filed Aug. 14, 2000 by SD3, LLC, the disclosure of which is herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
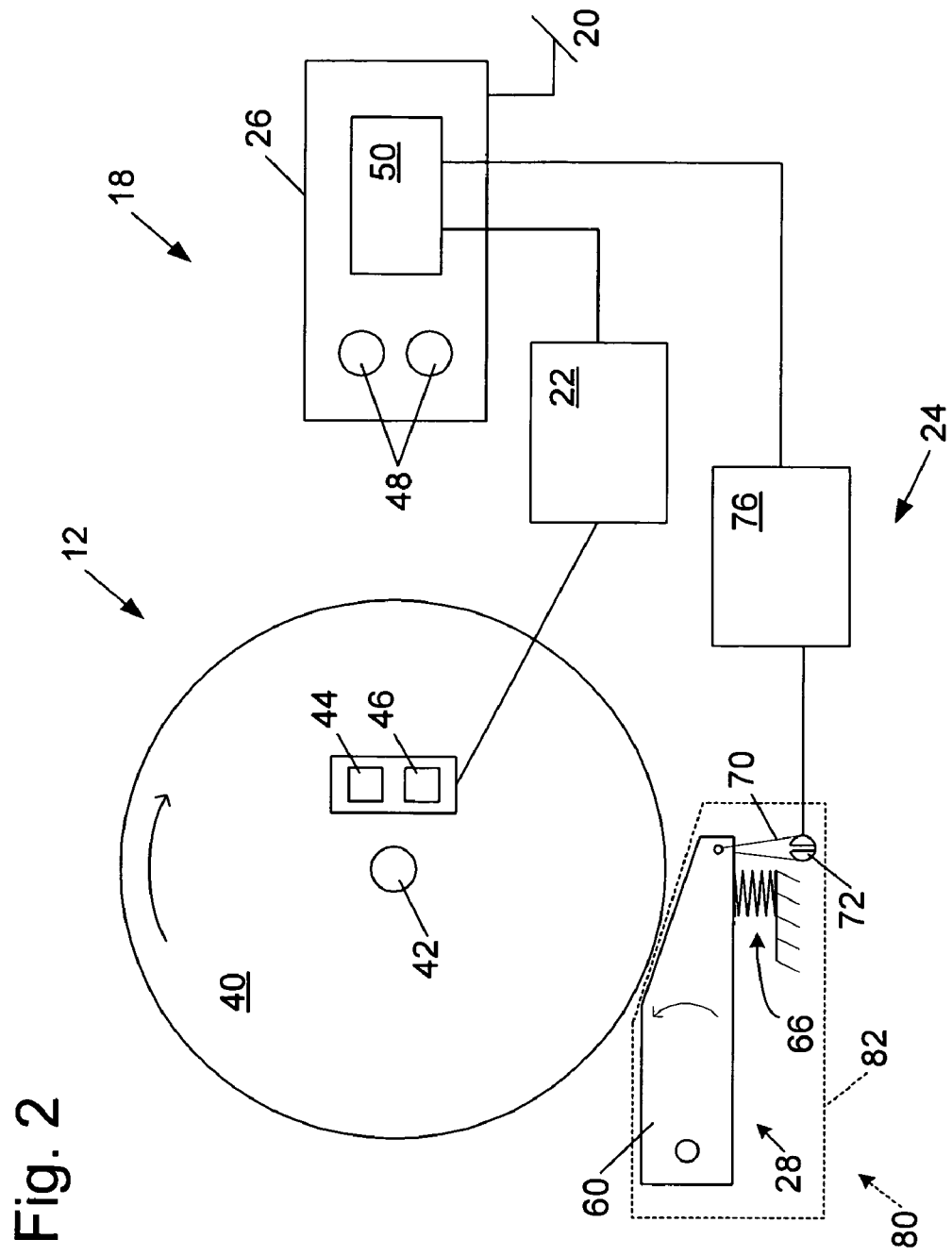
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Provisional Patent Application Ser. No. 60/225,210, entitled "Translation Stop For Use In Power Equipment," filed Aug. 14, 2000 by SD3, LLC, the disclosure of which is herein incorporated by reference, describes other systems for stopping the movement of the cutting tool. U.S. Provisional Patent Application Ser. No. 60/225,058, entitled "Table Saw With Improved Safety System," filed Aug. 14, 2000 by SD3, LLC, and U.S. Provisional Patent Application Ser. No. 60/225,057, entitled "Miter Saw With Improved Safety System," filed Aug. 14, 2000 by SD3, LLC, the disclosures of which are herein incorporated by reference, describe safety system 18 in the context of particular types of machines 10.

In the exemplary implementation, detection subsystem 22 is adapted to detect the dangerous condition of the user coming into contact with blade 40. The detection subsystem includes a sensor assembly, such as contact detection plates 44 and 46, configured to detect any contact between the user's body and the blade. The detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, entitled "Contact Detection System For Power Equipment," filed Aug. 14, 2000 by SD3, LLC, the disclosure of which is herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, entitled "Logic Control For Fast Acting Safety System," filed Aug. 14, 2000 by SD3, LLC, and U.S. Provisional Patent Application Ser. No. 60/225,094, entitled "Motion Detecting System For Use In Safety System For Power Equipment," filed Aug. 14, 2000 by SD3, LLC, the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately $\frac{1}{32}$-inch to $\frac{1}{4}$-inch from the edge of the blade by fusible member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, entitled "Firing Subsystem For Use In Fast Acting Safety System," filed Aug. 14, 2000 by SD3, LLC, U.S. Provisional Patent Application Ser. No. 60/225,170, entitled "Spring-Biased Brake Mechanism for Power Equipment," filed Aug. 14, 2000 by SD3, LLC, and U.S. Provisional Patent Application Ser. No. 60/225,169, entitled "Brake Mechanism For Power Equipment," filed Aug. 14, 2000 by SD3, LLC, the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, entitled "Replaceable Brake Mechanism For Power Equipment," filed Aug. 14, 2000 by SD3, LLC, and U.S. Provisional Patent Application Ser. No. 60/225,212, entitled "Brake Positioning System," filed Aug. 14, 2000 by SD3, LLC, the disclosures of which are herein incorporated by reference.

While one particular implementation of safety system 18 has been described, it will be appreciated that many variations and modifications are possible within the scope of the invention. Many such variations and modifications are described in U.S. Provisional Patent Application Ser. Nos. 60/182,866 and 60/157,340, the disclosures of which are herein incorporated by reference.

As mentioned above, contact detection plates 44 and 46 are used to detect contact between the user's body and cutting tool 14. It will be appreciated that detection subsystem 22 may employ any one or more of a wide variety of methods for detecting contact between the blade and a user's body. In view of the relatively high response speed of electronic signals and circuits, one suitable method includes using electrical circuitry to detect an electronic connection between a user and the cutting tool. It has been found that the capacitance of a user's body, as measured through dry contact with a portion of the user's body, is approximately 25-200 picofarads. The measured contact capacitance tends to increase with increasing body size and with increased coupling between the user's body and an electrical ground.

As a result of the inherent capacitance of a user's body, when the user touches cutting tool 14, the capacitance of the user's body is electrically coupled to the inherent capacitance of the cutting tool, thereby creating an effective capacitance that is larger than the inherent capacitance of the cutting tool alone. Thus, detection subsystem 22 may be electrically coupled to measure the capacitance of the cutting tool, so that any substantial change in the measured capacitance would indicate contact between the user's body and the cutting tool.

The exemplary implementation depicted in FIG. 2 illustrates a detection subsystem 22 that is configured to detect contact between a user and the cutting tool through a capacitive coupling between the blade and plates 44, 46. Detection system 22 includes suitable electrical circuitry (e.g., such as described in U.S. Provisional Patent Application Ser. No. 60/225,200, entitled Contact Detection System for Power Equipment, filed Aug. 14, 2000, by SD3, LLC) to transmit an input signal to plate 44, and to detect the input signal through plate 46. Plate 44 is mounted close to, but spaced-apart from, blade 40. Plate 44 is capacitively coupled to the saw blade by virtue of its size and placement parallel to and spaced-apart from the saw blade. Plate 46 is also mounted close to, but spaced-apart from, the saw blade to establish a second capacitive coupling. It is within the scope of the present invention that the number, size and placement of charge plates may vary.

The effect of this arrangement is to form two capacitors in series through the blade, creating a capacitive shunt at the junction between the capacitors. Plates 44 and 46 function as charge plates of the capacitors. The input signal is capacitively coupled from charge plate 44 onto blade 40, and then capacitively coupled from the blade to charge plate 46. Any change in the capacitance of the blade changes the signal coupled to charge plate 46.

When a user touches blade 40, the capacitance of the user's body creates a capacitive load on the blade. As a result, the size of the capacitive shunt between the charge plates and the blade is increased, thereby reducing the charge that reaches plate 46. Thus, the magnitude of the input signal passed through the blade to plate 46 decreases when a user touches the blade. Detection subsystem 22 is configured to detect this change in the input signal and transmit a contact detection signal to logic controller 50.

In some cases, there may be a significant amount of resistance at the contact point of the user's dry skin and the blade. This resistance may reduce the capacitive coupling of the user's body to the blade. However, when the teeth on the blade penetrate the outer layer of the user's skin, the moisture inherent in the internal tissue of skin will tend to decrease the resistance of the skin/blade contact, thereby establishing a solid electrical connection. The sensitivity of detection subsystem 22 can be adjusted as desired to recognize even slight changes in the input signal.

Generally speaking, the spacing of the charge plates from the blade is not critical, and may vary depending on the charge plate area and the desired capacitive coupling with the blade. However, it may be desirable to separate the plates from the blade by a distance selected to reduce the effect of deflections in the blade on the capacitance between the blade and the plates. For instance, if the blade is displaced $\frac{1}{32}$ of an inch toward one of the plates by loads created during cutting operations, the capacitance to that plate is increased. Since the capacitance is proportional to the area of the plate divided by the spacing, a relatively large spacing reduces the relative effect of a given blade displacement. Distances in the range of approximately $\frac{1}{32}$ inch and approximately $\frac{1}{2}$ inch have proven effective, although values outside this range could be used under appropriate circumstances.

It will be appreciated that the charge plates may be positioned at any point adjacent one or both sides and/or the perimeter of the blade. In the exemplary embodiment, the plates are disposed relatively close to the center of the blade. Since the deflection of the blade typically is at a minimum near the arbor upon which it is mounted, placing the charge plates close to the arbor has the advantage of minimizing the effect of blade deflection on the capacitive coupling between the plates and the blade. In various alternative embodiments, the outer edges of at least one of the charge plates is radially spaced within 50%, 40%, 30%, 20% or 10% of the blade's radius from the center of the blade.

The charge plates may be mounted within machine 10 in any suitable fashion known to those of skill in the art. For example, in the exemplary embodiment depicted in FIG. 3, operative structure 12 includes a pivotal arbor block 250 adapted to support arbor 42. The charge plates are mounted on a support member 251 (shown in dashed lines in FIG. 3), which is attached to arbor block 250. As a result, charge plates 44 and 46 pivot with the arbor block, thereby maintaining their position adjacent the blade. Alternatively, the charge plates may be mounted in a stationary configuration.

Figure 3:
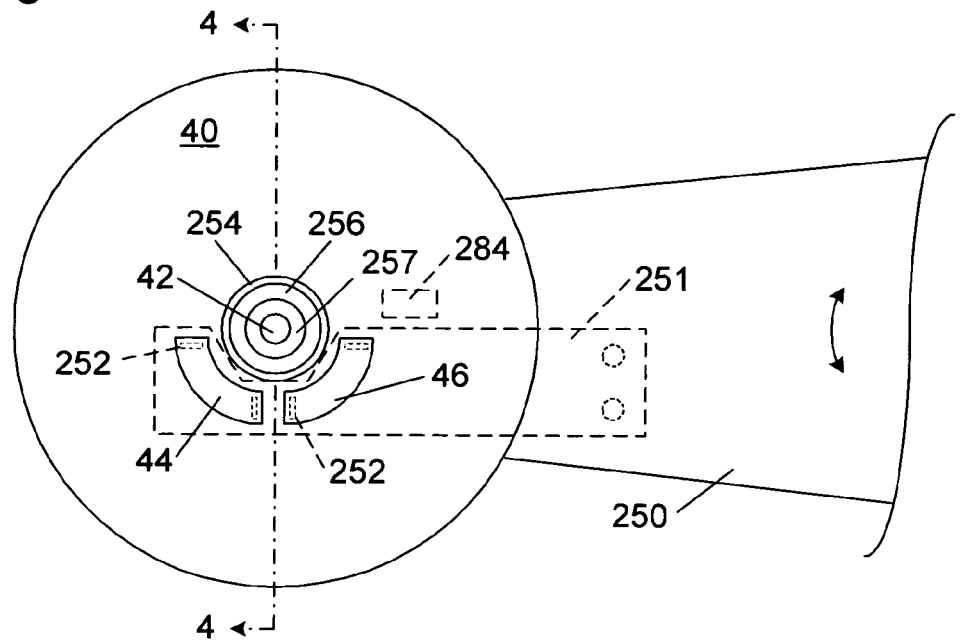
FIG. 3 is a schematic side elevation of an exemplary embodiment according to the present invention, showing the electrical isolation of the blade from the arbor and the mounting of the charge plates to capacitively couple to the blade. Indicated in dash lines are a bracket for mounting the charge plates, spacers between the charge plates and blade, and a brush contact mounted on the arbor block.
Figure 4:
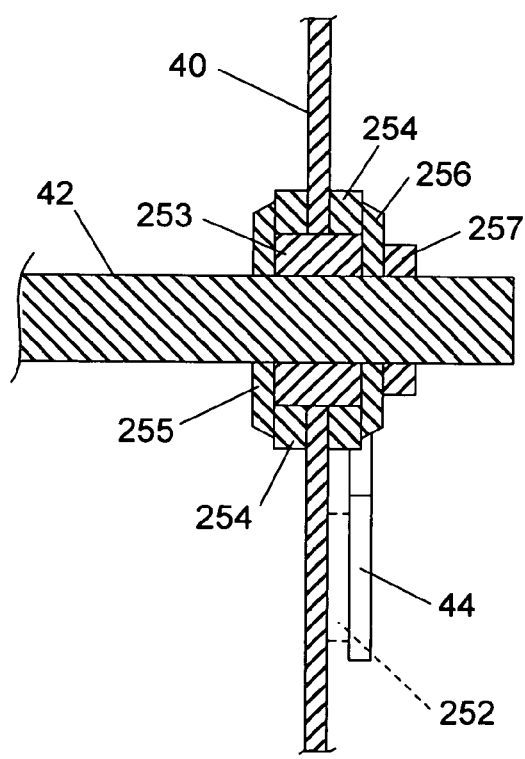
FIG. 4 is a magnified cross-sectional view take generally along the line 4-4 in FIG. 3. For clarity, the mounting bracket indicated in FIG. 3 is not shown.

In an alternative embodiment, at least one of the charge plates may include one or more insulating spacers 252 mounted on the side of the charge plate adjacent the blade, such as shown in FIGS. 3 and 4. Spacers 252 act as physical barriers to prevent the blade from deflecting too close to the charge plate. This may be especially useful when the distances between the charge plates and the blade are relatively small. The spacers may be constructed of any suitable electrically insulating material, including ceramic, glass, plastic, etc. In the exemplary embodiment depicted in FIGS. 3 and 4, spacers 252 cover only a small portion of the area between the charge plates and the blade. As a result, the spacers have relatively little effect on the capacitance between the blade and the plate. Alternatively, the spacers may cover a substantially larger portion, or even all of the space between the charge plates and the blade. In this latter case, the spacer will function, at least partially, as the dielectric between the conductive surfaces of the charge plates and the blade. Thus, the capacitance between the blade and the charge plates will depend on the dielectric constant of the spacer.

In addition to the one or more spacers mounted between the charge plates and the blade, opposing spacers (not shown) may be mounted on the side of the blade opposite the charge plates to prevent the blade from deflecting too far from the charge plates. Alternatively, one charge plate may be mounted on the opposite side of the blade from the other charge plate. Further, the spacers may be designed to slide on the surface of the blade as it moves. Additionally, if the charge plates are mounted to move into and away from the side of the blade, and resiliently biased toward the blade, the charge plates and spaces will move with any deflections of the blade, thereby maintaining contact between the spacers and blade even when the blade is deflected. An advantage of this arrangement is the close spacing that can be established and maintained, thereby reducing the size of the plates and maintaining a constant capacitance between the charge plate and blade.

It will be appreciated that the size of charge plates 44 and 46 may also vary. Typical plate areas are between 1 and 10 square inches, although many different sizes may be used, including sizes outside of this typical range. In the exemplary embodiment, the charge plate sizes are selected, in conjunction with charge plate spacing and dielectric material, to provide a charge plate-to-blade capacitance that is comparable (e.g., within an order of magnitude) with the capacitance of the human body. This configuration serves to improve the signal-to-noise ratio of the input signal detected by charge plate 46. Furthermore, charge plate 44 may be a different size than charge plate 46 and/or be spaced closer or farther apart from the blade to provide different capacitances. For example, it may be desirable to size drive charge plate 44 larger than sense charge plate 46 to increase the coupling of the drive charge plate.

An example of a suitable charge plate material is copper-plated printed circuit board, which is relatively rigid, flat and thin. Other examples include any relatively electrically conductive material such as gold, aluminum, copper, steel, etc. The charge plates may take any shape suitable for the particular clearances of machine 10. Where there are large grounded metal structures near the blade, a larger driving charge plate 44 can be used to partially shield the blade from capacitive coupling to the grounded structure. Although the larger plate also will have increased capacitive coupling to the grounded structure, this does not interfere with the operation of detection subsystem 22 because the detection subsystem is capable of driving much larger capacitance loads than are created under these circumstances.

It will be appreciated by those of skill in the art that blade 40 should be insulated from electrical ground to allow the input signal to be capacitively coupled from charge plate 44 to charge plate 46. In the exemplary embodiment depicted in FIGS. 3 and 4, blade 40 is electrically isolated from arbor 42 on which it rides, thus insulating the blade from ground and the remaining structure of the machine. There are a variety of suitable arrangements for providing electrical insulation between the blade and the arbor, which may vary depending on the particular configuration of machine 10. For example, in the case of a ⅝-inch arbor shaft 42, blade 40 can be formed with a one-inch diameter hole into which a 3/16-inch thick cylindrical plastic bushing 253 is fitted, such as shown in FIGS. 3 and 4. Insulating washers 254 are disposed on either side of the blade to isolate the blade from the arbor flange 255 and arbor washer 256. The insulating washers should be thick enough that only negligible capacitance is created between the blade and the grounded arbor flange and washer. A typical thickness is approximately ⅛-inch, although 1/32-inch or less may be suitable depending on other factors. In addition, it is possible to construct some or all of the arbor components from non-conductive materials, such as ceramic, to reduce or eliminate the need for electrical isolation from the arbor.

An arbor nut 257 holds the entire blade assembly on arbor 42. Friction established by tightening the arbor nut allows torque from the arbor to be transmitted to the saw blade. It is preferable, although not essential, that the blade be able to slip slightly on the arbor in the event of a sudden stop by the brake to reduce the mass that must be stopped and decrease the chance of damage to the blade, arbor, and/or other components in the drive system of the saw. Furthermore, it may be desirable to construct the bushing from a material that is soft enough to deform when the blade is stopped suddenly. For example, depending on the type of braking system used, a substantial radial impact load may be transmitted to the arbor when the brake is actuated. A deformable bushing can be used to absorb some of this impact and reduce the chance of damage to the arbor. In addition, proper positioning of the brake in combination with a deformable bushing may be employed to cause the blade to move away from the user upon activation of the brake, as is discussed U.S. Provisional Application Ser. No. 60/225,089, entitled Retraction System for Use in Power Equipment, filed Aug. 14, 2000, by SD3, LLC.

It will be appreciated that the blade insulation assembly described above does not require special saw blades such as are described in U.S. Pat. No. 4,026,177. Indeed, arbor 42 may be sized to fit within a plastic bushing 253 received within a standard saw blade 40 having a ⅝-inch diameter hole. Thus, an operator may use any standard blade on machine 10.

Figure 5:
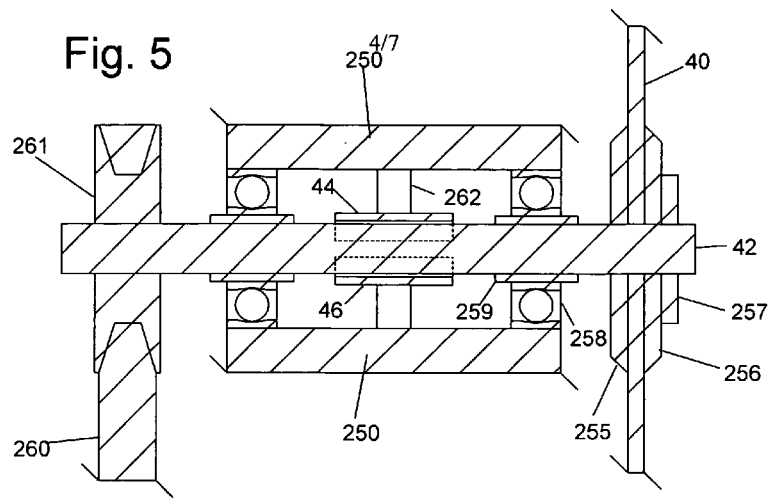
FIG. 5 is a schematic cross-sectional view of another exemplary embodiment according to the present invention in which the arbor is electrically insulated from the arbor block and the charge plates are capacitively coupled to the arbor.

As an alternative to insulating the blade from the arbor, the arbor and/or part of its supporting framework may be electrically isolated from ground. One benefit of this embodiment is that if the blade is electrically connected to the arbor, then the arbor itself can be used to capacitively couple the input signal from charge plate 44 to charge plate 46. As a result, the charge plates are unlikely to interfere with installation and removal of the blade, and thus unlikely to be damaged or removed by a user. While the particular implementation of this alternative embodiment will vary with the configuration of the cutting tool, one exemplary implementation is depicted in FIG. 5.

As shown, blade 40 is mounted directly onto arbor 42. As in FIG. 4, the blade is secured to the arbor by arbor flange 255, arbor washer 256 and arbor nut 257. The arbor is supported for rotational movement relative to an arbor block 250 by one or more bearings 258 mounted in the arbor block and spaced along the elongate axis of the arbor. However, bearings 258 do not contact the arbor directly. Instead, electrically insulating sleeves 259 are disposed between the arbor and the bearings. Arbor block 250 is movable to allow the blade to be raised and lowered, as well as to be inclined for angled cuts. A motor (not shown) drives the arbor through a belt 260 that loops over a pulley 261 on the end of the arbor opposite the blade. The belt typically is non-conducting and thus does not electrically couple the arbor to ground.

Sleeves 259 may be constructed of any suitable material that is relatively durable and non-conductive, including plastic, ceramic, etc. The sleeves may be configured to fit over a constant-diameter arbor as shown, or the arbor may be notched to receive the sleeves so that the outer diameter of the sleeves are flush with the outer diameter of the arbor. Furthermore, it will be appreciated that there are many other arrangements for electrically insulating the arbor. As just a few examples, sleeves 259 may be disposed between bearings 258 and arbor block 250, or at least portions of the bearings may be constructed of non-conductive materials. For example, ceramic bearings may be used. Alternatively, larger portions of the arbor assembly may be isolated from the rest of the saw.

In any event, charging plates 44 and 46 are disposed alongside, but slightly spaced from, the arbor. The charging plates typically are shaped and arranged relative to the arbor to ensure adequate capacitive coupling. For example, the charging plates may be trough-shaped to conform to the cylindrical shape of the arbor, as illustrated in FIG. 5. Alternatively, the plates may be in the form of a ring or tube to completely surround axially-spaced portions of the arbor. The charging plates typically are supported on arbor block 250, such as by mounts 262 extending from the frame. This arrangement ensures that the charging plates will move in tandem with the arbor when the position or angle of the blade is adjusted. The mounts usually will be configured to electrically insulate the charging plates from the frame. The charge plates can be positioned very close to the arbor because it does not deflect during use like the blade, thereby allowing smaller charge plates to be utilized.

Figure 6:
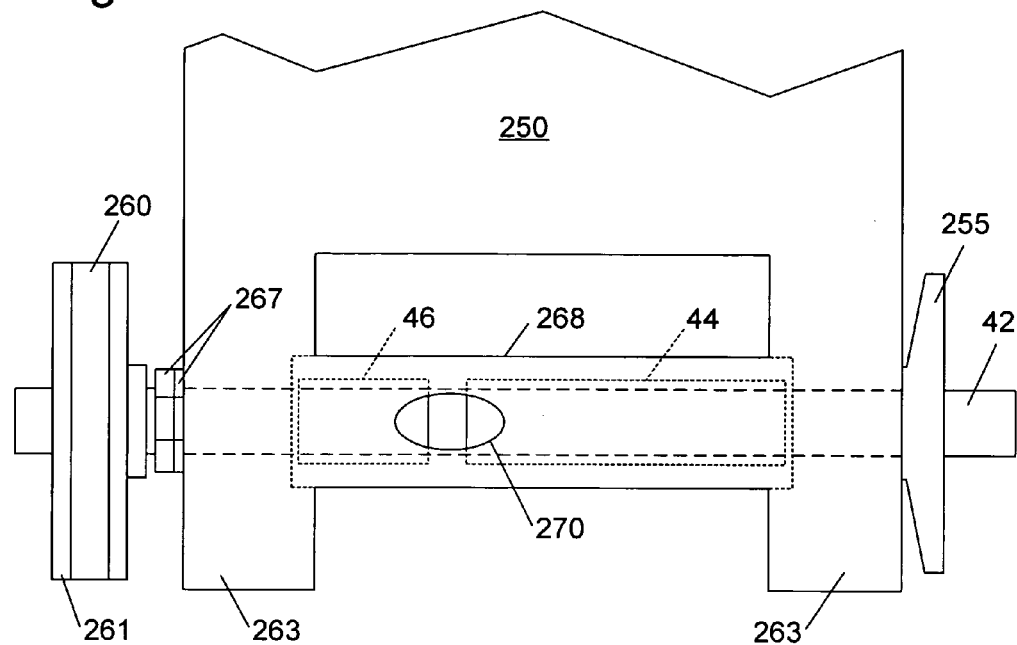
FIG. 6 is a top plan view showing the isolation of, and capacitive coupling to, an arbor on a contractor style table saw in accordance with another embodiment of the present invention.
Figure 7:
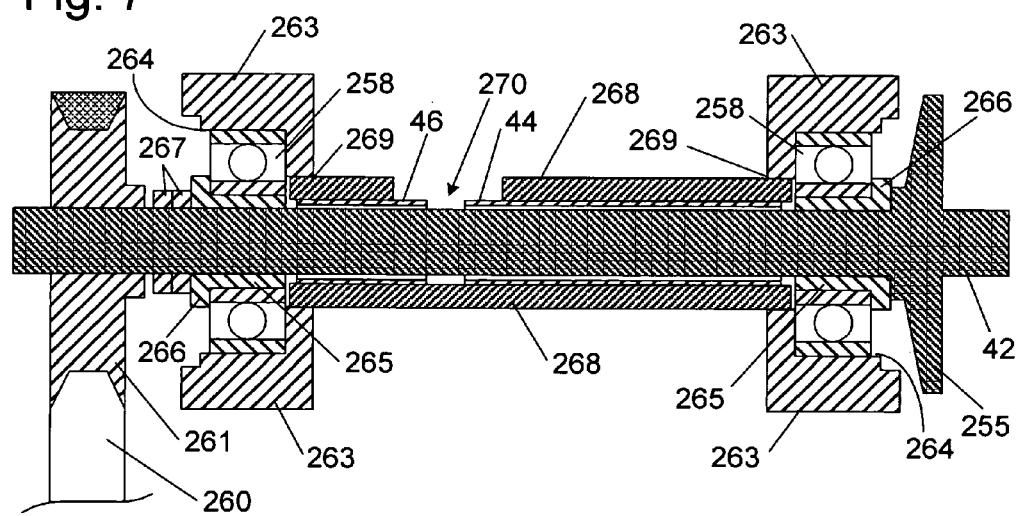
FIG. 7 is a cross-sectional view of the embodiment of FIG. 6 taken generally along the central elongate axis of the arbor and viewing away from the arbor block.

Turning attention to FIGS. 6 and 7, an alternative arrangement for capacitively coupling charge plates 44 and 46 to arbor 40 is shown. This arrangement has proven suitable for use with contractor style table saws which are available from a variety of manufacturers. Arbor block 250 includes two spaced-apart, and generally parallel support members 263 adapted to receive bearings 258 within central recesses 264. Electrically-insulating bushings 265 are disposed in the bearings and adapted to receive arbor 42. Each bushing 265 includes an outer lip or flange 266 which abuts the outer edges of the bearing. The bushings may be constructed of ERTYL-ITE™ (PET-P), or any other electrically-insulating material adapted to support the arbor within the bearings.

Arbor flange 255 is integrally formed with arbor 42 and abuts against the flange of one of bushings 265. The opposite end of arbor 42 is threaded to receive one or more locking nuts 267, which tighten against the flange of the other bushing 265 to retain arbor 42 within bearings 258. Pulley 261 is mounted on the arbor adjacent locking nuts 267.

As shown in FIG. 7, bushings 265 completely insulate the arbor from the bearings and the arbor block. Alternatively, the bushings could be configured to fit between bearings 258 and support members 263. In any event, the arbor remains securely and symmetrically positioned to rotate freely within the bearings.

Charge plates 44 and 46 take the form of electrically-conductive tubes having inner diameters larger that the diameter of arbor 42. Tubes 44, 46 may be constructed of any suitable material such as brass tube, copper pipe, etc. It will be appreciated that the size of charge tubes 44 and 46 may be selected to provide a desired capacitance with the arbor. Indeed, the size of the charge tubes may be different to provide different capacitances. For example, in the embodiment depicted in FIGS. 6 and 7, charge tube 44 is longer than charge tube 46, thereby providing a higher capacitance between charge tube 44 and the arbor, than between charge tube 46 and the arbor. Alternatively, or additionally, the inside diameters of the charge tubes may be different to provide different capacitances due to different arbor-to-charge plate spacings.

Charge tubes 44 and 46 are received in an electrically-insulating support housing or tube 268, having an inner diameter adapted to receive charge tubes 44 and 46. Insulating tube 268 may be formed of any suitable electrically-insulating material such as polycarbonate, nylon, PVC, etc. The insulating tube serves to prevent the charge tubes from being grounded by the arbor block, bearings, etc. Insulating tube 268 is positioned around arbor 42 and received into inner apertures 269 in support members 263. Inner apertures 269 are axially colinear with arbor 42. Thus, where charge tubes 44 and 46 are centrally positioned within the insulating tube, the inner diameters of the charge tubes are automatically positioned by the insulating tube to be axially colinear or symmetrical with the arbor.

It will be appreciated that while the charge tubes and insulating tube in the exemplary embodiment are cylindrical, other shapes may also be used. For example, insulating tube 268 may have a rectangular outer cross-section while maintaining its circular inner cross-section. Likewise, charge tubes 44 and 46 may have any suitable outer cross-sectional shape to match the inner shape of the insulating tube. In any event, mounting the charge tubes to support members 263 ensures that the support tubes maintain the correct position about the arbor regardless of the movement of arbor block 250.

In addition to electrically insulating and automatically positioning the charge tubes, insulating tube 268 also serves to enclose and protect the charge tubes from damage and debris. In the exemplary embodiment, insulating tube 268 defines a hole 270 positioned between charge tube 44 and charge tube 46 to allow electrical cables (not shown) to be soldered or otherwise connected to the charge tubes to carry the signals to and from the detection circuitry of detector subsystem 22. Alternatively, two holes may be used, each positioned over one of the charge tubes.

Since the charge tubes should not come into contact with each other, the fit between the charge tubes and insulating tube is typically tight enough to frictionally prevent movement of the charge tubes along the axis of the insulating tube. Alternatively, a bump or ring may be formed or positioned on the inner diameter of the insulating tube between the charge tubes to prevent the charge tubes from coming into contact. As a further alternative, hole 270 may be used to apply a caulk, glue, epoxy, or similar material between the charge tubes and insulating tube to prevent the charge tubes from moving. As another alternative, one or more set-screws may be threaded through the insulating tube to bear against the charge tubes.

Figure 8:
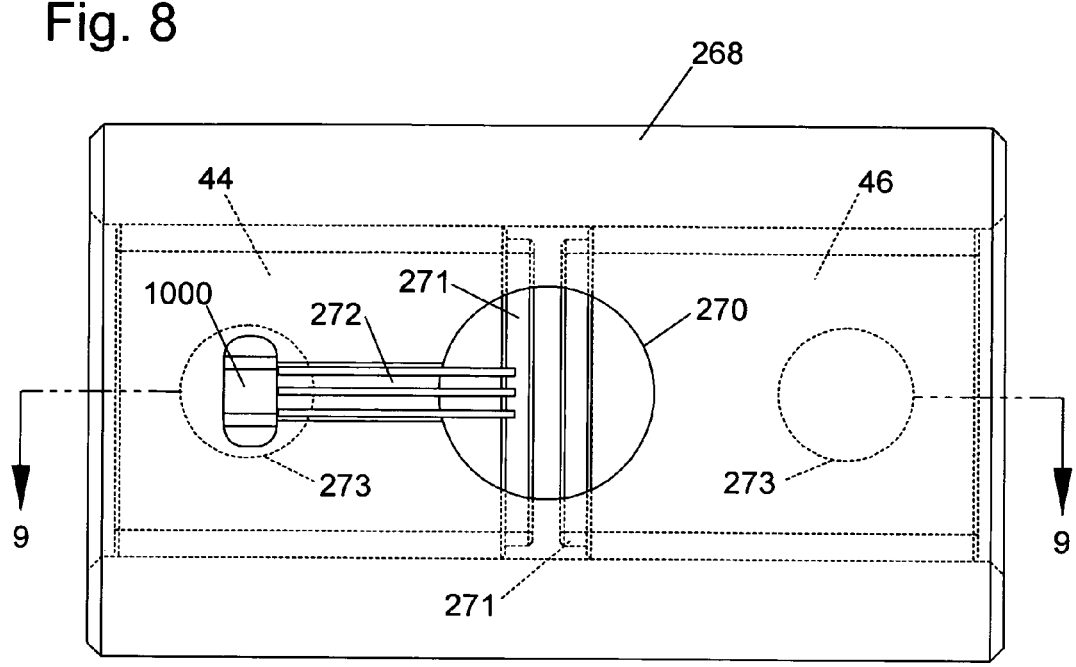
FIG. 8 is a top plan view showing an alternative assembly for coupling the charge plates to the arbor of a contractor style table saw in accordance with the present invention.
Figure 9:
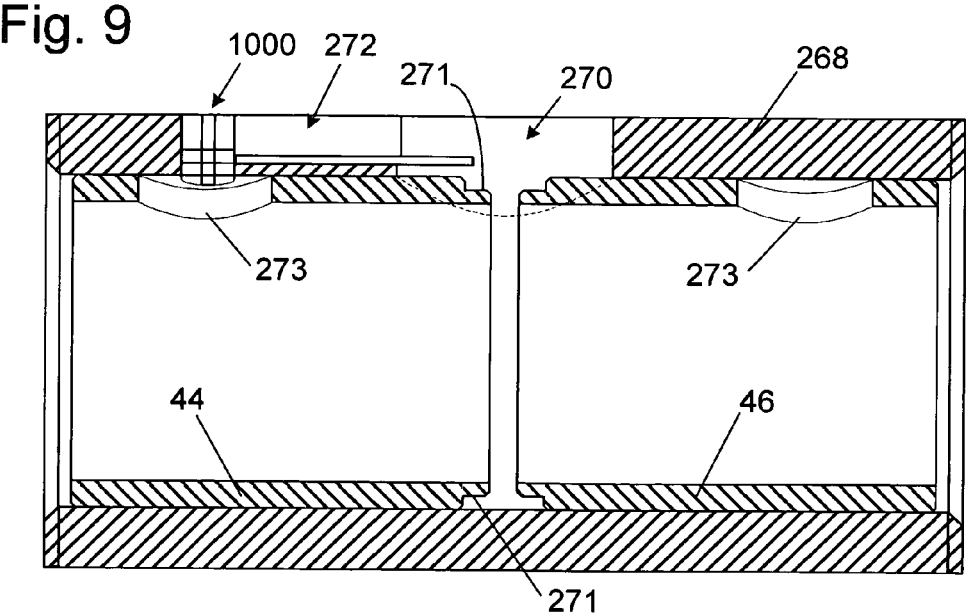
FIG. 9 is a cross-sectional view taken generally along the line 9-9 in FIG. 8.

Turning attention now to FIGS. 8 and 9, an alternative embodiment of the insulating tube and charge tubes for use with a contractor style saw is depicted. Insulating tube 268 includes a hollow bore with outwardly beveled ends to receive charge tubes 44 and 46. Each charge tube has an inner narrowed rim portion 271 to which an electrical cable (not shown) may be attached (e.g., by solder, etc.). The narrowness of rims 271 allow the cables to be attached before the charge tubes are inserted into the insulating tube. Typically, the cables are fed through hole 270.

Insulating tube 268 also includes a recessed region 272 adapted to receive a Hall Effect or similar sensor assembly 1000 for detecting blade/arbor rotation. Sensor 1000 is described in more detail in U.S. Provisional Patent Application Ser. No. 60/225,094, entitled Motion Detection System for Use in Safety System for Power Equipment, filed Aug. 14, 2000, by SD3, LLC. The sensor is aligned over a hole 273 in charge tube 44 to sense the passage of a magnet disposed on the arbor (not shown). Alternatively, the sensor may be aligned over a hole 273 in charge plate 46. In some cases, such as where charge plates 44 and 46 are identical, it may be desirable to place hole 273 in both charge plates to reduce the number of different parts for manufacture.

While a few exemplary arrangements for capacitively coupling the charge plates to the arbor have been described, it will be understood that there are many suitable arrangements and that the invention is not limited to any particular one. For example, if there is insufficient room between the bearings for the charge plates, one or both of the charge plates may be positioned between the bearings and the pulley, or on the side of the pulley opposite the bearings.

It will appreciated that one or both of the charge plates may be capacitively coupled to other portions of operative structure 12 rather than blade 40 or arbor 42. For example, charge plates 44 and 46 may be coupled to an arbor block 250 which is electrically insulated from the remainder of the operative structure and machine 10. In such a configuration, the blade should be electrically coupled to the arbor block. Therefore, insulating bushings between the blade and arbor, or between the arbor and arbor block, should be omitted. As additional examples, the charge plates may be coupled to the bearings, pulley, etc.

Figure 10:
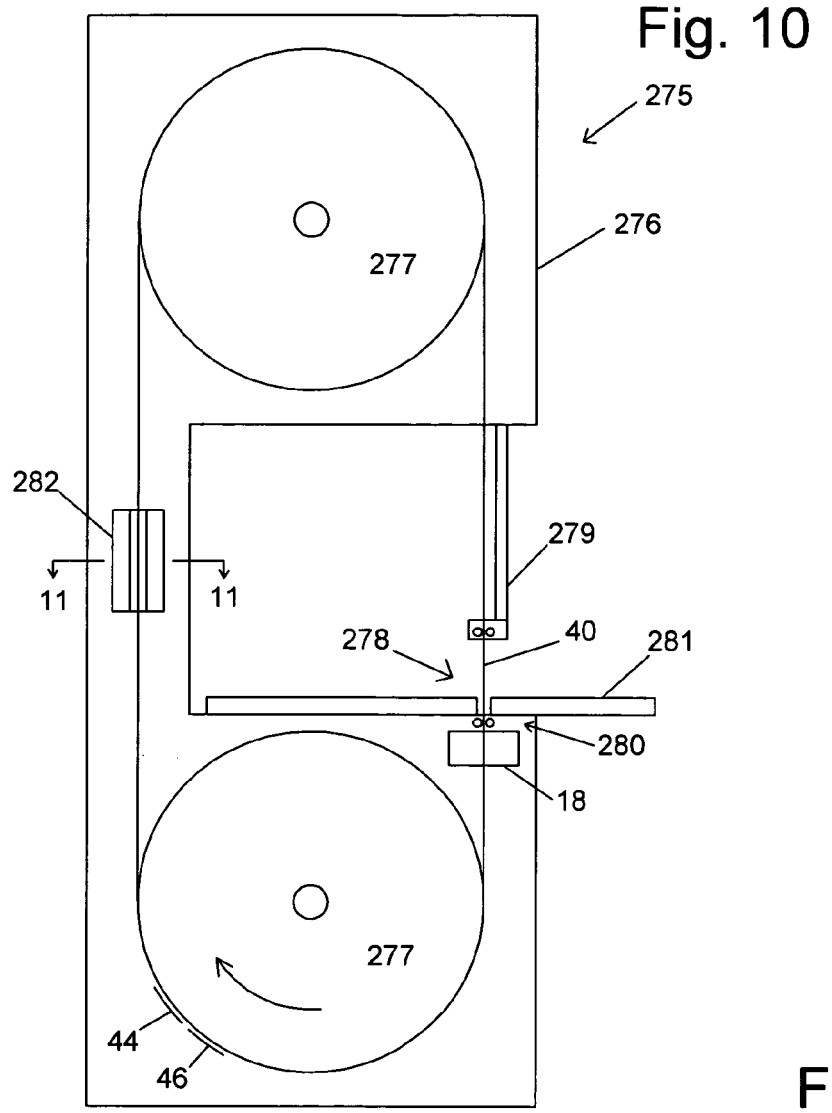
FIG. 10 is a schematic side elevation of a further embodiment according to the present invention in the context of a band saw.
Figure 11:
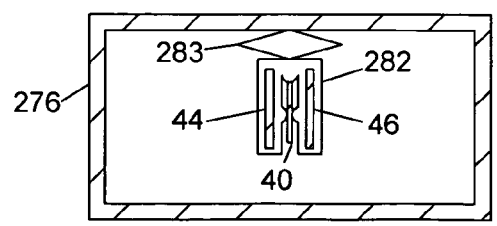
FIG. 11 is a magnified cross-sectional view taken generally along the line 11-11 in FIG. 10.

It also will be appreciated that charge plates 44 and 46 may be capacitively coupled to other types of cutting tools, including those with a non-circular blade or cutter. For example, FIGS. 10 and 11 depict an exemplary embodiment in which the charge plates are capacitively coupled to the blade of a band saw 275. Typically, band saw 275 includes a main housing 276 enclosing a pair of vertically spaced-apart wheels 277. The perimeter of each wheel 277 is coated or covered in a high-friction material such as rubber, etc. A relatively thin, continuous loop blade 40 tightly encircles both wheels. A workpiece is cut by passing it toward blade 40 in a cutting zone 278 between wheels 277. An upper blade-guide assembly 279 and a lower blade-guide assembly 280 maintain the revolving blade in a stable path within cutting zone 278. The workpiece is passed toward the blade on a table 281, which forms the bottom of the cutting zone.

The blade should be electrically insulated from the main housing, which usually is grounded. Thus, blade-guide assemblies 279 and 280, which may include ball-bearing guides and/or friction pads, etc., are constructed to electrically insulate the blade from the main housing. In addition, the high-friction coating on wheels 277 electrically insulates the blade from the wheels. Alternatively, the wheels may be constructed of electrically non-conductive material.

Charge plates 44 and 46 may be arranged in a variety of ways depending on the application and the space constraints within the main housing. Two possible arrangements are illustrated in FIG. 10. In the first arrangement, charge plates 44 and 46 are disposed closely adjacent the blade as it rides along one of the wheels 277. The charge plates may be formed in an arc to match the perimeter of the wheel and maintain a constant spacing with the blade. This arrangement has the advantage of easily maintaining a constant blade-to-charge plate spacing since the blade is held in a constant path against the perimeter of the wheel. The charge plates may be connected to the main housing via a non-conductive mount to maintain electrical insulation from the housing.

Another of the many possible arrangements for the charge plates includes a charge plate block 282 which is configured to extend along the blade as it travels between wheels 277. As can best be seen in the detail view of FIG. 11, the charge plate block includes charge plates 44 and 46. In the depicted implementation, the charge plate block has a substantially C-shaped cross-section sized to fit around the sides and back edge (i.e., non-toothed edge) of the blade. The charge plate block is mounted on main housing 276 and resiliently biased, such as by one or more springs 283, toward the moving blade. Since blade 40 may tend to move or deflect slightly in its path, springs 283 ensure that the charge plate block is able to move along with blade. Charge plate block 282 typically is made of a durable, electrically non-conductive material such as ceramic, plastic, etc. Charge plates 44 and 46 are disposed on or within the charge plate block. Although the charge plates are illustrated as being disposed on opposite sides of blade 40, the charge plates may alternatively be on the same side of the blade. The self-aligning configuration of the charge plate block ensures that the blade-to-charge plate spacing is substantially constant despite the motion of the blade.

In addition to band saws, the charge plates may be capacitively coupled to machines such as jointers, planers, etc., which have cylindrical cutter heads. The cutter heads typically are mounted to rotate about an arbor. Thus, charge plates 44 and 46 may be capacitively coupled to the arbor as described above, or to a flat end of the cutter head, etc.

While one exemplary system and method for detecting contact between the user's body and the blade is described herein, many other systems and methods are available and within the scope of the invention. For example, the detection system may sense the resistance of the human body upon contact between the user's body and the blade. As shown in FIG. 3, the sensor assembly of detection subsystem 22 may include a brush contact 284 or similar sensor to make direct electrical contact with the blade. Brush contact 284 may be mounted, for example, on arbor block 250. Typically, the blade and brush contact are electrically isolated from the arbor block. Alternatively, the brush contact may be configured to directly couple the arbor or another portion of operative structure 12 as described above in connection with charge plates 44 and 46. In any event, contact between the user's body and blade would function as a switch to form a conductive path detectable by suitable circuitry in detection subsystem 22 and/or control subsystem 26. As a further alternative, brush contact 284 may be used to detect a capacitive rather than conductive load upon the blade. As a further alternative, the detection subsystem sensor assembly may be configured to detect contact by optical, magnetic, or other non-electrical means.

Figure 12:
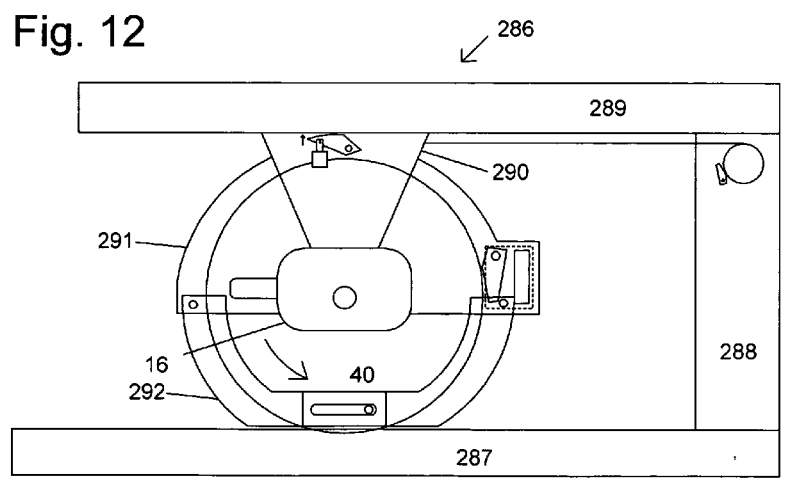
FIG. 12 is a side elevation of another embodiment according to the present invention in which contact with a guard is detected in the context of a radial arm saw.

As an alternative to detecting contact between the user and the blade, detection subsystem 22 may be configured to detect proximity of the user's body to the blade by detecting contact between the user's body and a guard adjacent the blade. If the guard is positioned so that the user's body must contact the guard before contacting the blade, then the blade may be stopped before the user comes into contact with the blade. It will be appreciated that this alternative detection subsystem may be implemented in a variety of different configurations and for any type of machine 10. As one example, FIG. 12 shows an exemplary embodiment for use on a radial arm saw 286.

Typically, radial arm saw 286 includes a horizontal base 287, a vertical support column 288 extending upward from base 287, and a guide arm 289 which extends from column 288 vertically spaced above base 287. A carriage 290 is slidably coupled to the underside of guide arm 289. The bottom end of carriage 290 is connected to a saw housing 291 and motor assembly 16, allowing blade 40 to be pulled across the base to cut workpieces (not shown) supported on the base. A guard member 292, such as those known in the art, is positioned on at least one side of blade 40. Guard member 292 is disposed relative to the blade so that any portion of the user's body approaching the blade will first strike against the guard member. Typically, guard member 292 is movably coupled to housing 291 to maintain its blade-shielding position as the blade passes over the workpiece.

The guard member is electrically insulated from housing 291 but electrically coupled to the detection subsystem (not shown). Thus, any contact between the user's body and the guard member is detected. The detection subsystem may be conductively coupled to the guard member by any suitable means (not shown) such as electrical cable, etc. Alternatively, the detection subsystem may be capacitively coupled to the guard member by one or more charge plates disposed adjacent the guard member such as described above.

As described above, the present invention provides a reliable, effective and fast-acting system for preventing serious injuries to operators of power cutting machinery. While a few specific embodiments of safety system 18 and machine 10 have been described above, those of skill in the art will appreciate that the present invention may be adapted in numerous ways for use in a wide variety of applications. Therefore, it will be understood that all such adaptations and applications are within the scope of the invention.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A woodworking machine comprising:
   a motor;
   an electrically isolated arbor configured to be driven by the motor;
   a cutting tool coupled to the arbor;
   an excitation system adapted to generate an electrical signal;
   a capacitive coupling adapted to capacitively couple the excitation system to the arbor to transfer at least a portion of the electrical signal to the cutting tool, where the capacitive coupling includes a conductive plate substantially encircling the arbor; and
   an insulator substantially encircling the conductive plate.

2. The woodworking machine of claim 1 further comprising an opening in the insulator so that the excitation system can electrically couple to the conductive plate.

3. The woodworking machine of claim 1 further comprising a detection system configured to detect a dangerous condition between a person and the cutting tool and a second conductive plate adjacent the arbor.

4. The woodworking machine of claim 3 where the second conductive plate substantially encircles the arbor, and where the insulator substantially encircles the second conductive plate.

5. The woodworking machine of claim 4 further comprising an opening in the insulator so that the detection system can electrically couple to the second conductive plate.

6. The woodworking machine of claim 4 further comprising a first opening in the insulator so that the excitation system can electrically couple to the conductive plate and a second opening in the insulator so that the detection system can electrically couple to the second conductive plate.

7. The woodworking machine of claim 1 further comprising an arbor block adapted to support the arbor, and where the arbor block also supports the insulator.

8. The woodworking machine of claim 7 where the arbor block includes two spaced-apart support members and the insulator is held by the two spaced-apart support members.

9. The woodworking machine of claim 7 where the insulator supports the conductive plate.

* * * * *